United States Patent Office 3,068,252
Patented Dec. 11, 1962

3,068,252
2-METHYL-17α-ETHYNYL-Δ$^{1,4}$-ANDROSTADIENE-11β,17β-DIOL-3-ONE AND PROCESS FOR ITS PREPARATION
Gerard Nomine, Noisy-le-Sec, Daniel Bertin, Montrouge, and Hubert Fritel, Paris, France, assignors, by mesne assignments, to Roussel-UCLAF, S.A., Paris, France, a corporation of France
No Drawing. Filed Oct. 25, 1960, Ser. No. 64,734
Claims priority, application France Nov. 20, 1959
1 Claim. (Cl. 260—397.45)

The present invention relates to a novel androstadiene, namely, 2-methyl-17α-ethynyl-Δ$^{1,4}$-androstadiene-11β,17β-diol-3-one. The invention further relates to a novel sequence of steps to produce the said androstadiene and new intermediates therefor.

The 2-methyl-17α-ethynyl-Δ$^{1,4}$-androstadiene-11β,17β-diol-3-one has a pronounced antilipemic activity and has no estrogenic activity. The introduction of the methyl group in the 2-position inhibits estrogenic activity.

It is an object of the invention to obtain 2-methyl-17α-ethynyl-Δ$^{1,4}$-androstadiene-11β,17β-diol-3-one which has antilipemic activity.

It is another object of the invention to produce 2-methyl-17α-ethynyl-Δ$^{1,4}$-androstadiene-11β,17β-diol-3-one from 11β-hydroxy-testosterone by a novel process.

It is a further object of the invention to obtain as novel intermediates for 2-methyl-17α-ethynyl-Δ$^{1,4}$-androstadiene-11β,17β-diol-3-one the following compounds:

(a) 2-ethoxalyl-Δ$^4$-androstene-11β,17β-diol-3-one (II)
(b) 2-methyl-2-ethoxalyl-Δ$^4$-androstene-11β,17β-diol-3-one (III)
(c) 2α-methyl-Δ$^4$-androstene-11β,17β-diol-3-one (IV)
(d) The 17-acetate of 2α-methyl-Δ$^4$-androstene-11β,17β-diol-3-one (V)
(e) The 17-acetate of 2-methyl-Δ$^{1,4}$-androstadiene-11β,17β-diol-3-one (VI)
(f) 2-methyl-Δ$^{1,4}$-androstadiene-11β,17β-diol-3-one (VII)
(g) 2-methyl-Δ$^{1,4}$-androstadiene-11β-ol-3,17-dione (VIII)

These and other objects and advantages of the invention will become more obvious from the following detailed description.

According to the process of the invention, 2-methyl-17α-ethynyl-Δ$^{1,4}$-androstadiene-11β,17β-diol-3-one is produced by starting with 11β-hydroxy testosterone which may be obtained by the technique of Herr et al. [J. Am. Chem. Soc., vol. 75 (1953), p. 5927]. The 11β-hydroxy testosterone is ethoxalylated in the 2-position in the presence of an alkaline agent to form 2-ethoxalyl-Δ$^4$-androstene-11β,17β-diol-3-one, the latter is treated with methyl halide in an alkaline medium to form 2-methyl-2-ethoxalyl-Δ$^4$-androstene-11β,17β-diol-3-one, the said product is deacylated to form 2α-methyl-Δ$^4$-androstene-11β,17β-diol-3-one, the latter is acetylated to form the 17-acetate of 2α-methyl-Δ$^4$-androstene-11β,17β-diol-3-one, the said 17-acetate is then dehydrogenated to form the 17-acetate of 2-methyl-Δ$^{1,4}$-androstadiene-11β,17β-diol-3-one, the latter 17-acetate is saponified under alkaline conditions to the free 2-methyl-Δ$^{1,4}$-androstadiene-11β,17β-diol-3-one which is then treated by the Oppenauer method with an aluminum lower alkanolate in an organic solvent to form 2-methyl-Δ$^{1,4}$-androstadiene-11β-ol-3,17-dione. The latter compound is then reacted with acetylene to form the desired 2-methyl-17α-ethynyl-Δ$^{1,4}$-androstadiene-11β,17β-diol-3-one. Table I shows the reaction scheme of the present invention.

TABLE I

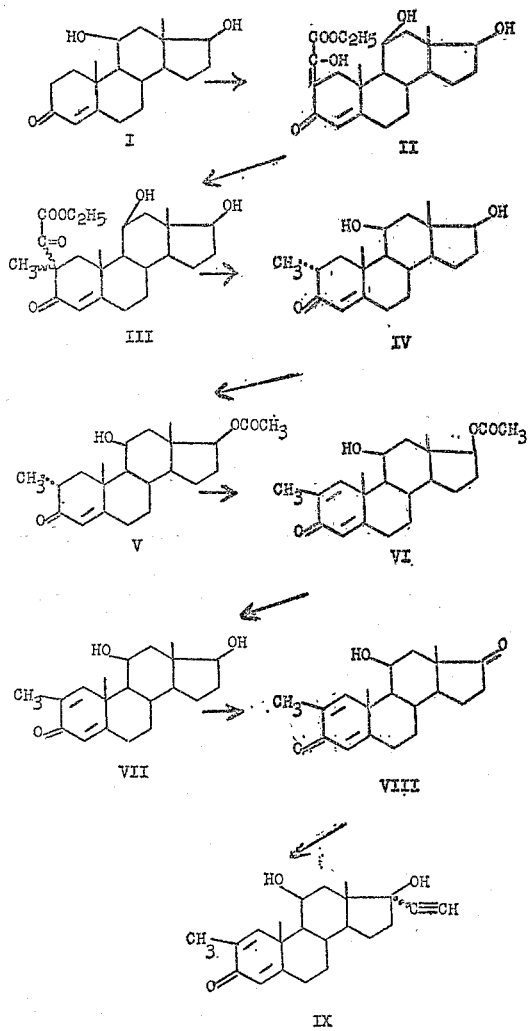

A preferred mode of the invention consists of ethoxalylation of 11β-hydroxy testosterone in the 2-position by reaction with ethyl oxalate in a tertiary alkanol such as t-butanol in the presence of an alkali metal alkanolate, such as sodium methylate, at room temperature to form 2-ethoxalyl-Δ$^4$-androstene-11β,17β-diol-3-one, reacting said product in an inert organic solvent, such as acetone, with methyl iodide in the presence of an alkali metal carbonate, such as potassium carbonate at reflux temperatures to form 2-methyl-2-ethoxalyl-Δ$^4$-androstene-11β,17β-diol-3-one, deacylating the latter compound by reaction at about room temperature under anhydrous conditions with an alkali metal alkanolate dissolved in said alkanol, preferably with sodium ethylate in ethanol to form 2α-methyl-Δ$^4$-androstene-11β,17β-diol-3-one, forming the 17-acetate of said compound by reaction with an acetylating agent, such as with acetic anhydride in pyridine at elevated temperatures up to the boiling point, dehydrogenating the said 17-acetate with selenium dioxide in the presence of an inert solvent such as t-butanol at reflux temperatures to form the 17-acetate of 2-methyl-Δ$^{1,4}$-androstadiene-11β,17β-diol-3-one, saponifying the latter 17-acetate with an alkali metal hydroxide, such as potassium hydroxide in methanol, at about room temperature, to form the free 2 - methyl-$\Delta^{1,4}$-androstadiene-11$\beta$,17$\beta$-diol-3-one, reacting dione, reacting the said dione in an inert organic solvent, preferably a hydrocarbon solvent such as toluene, with aluminum isopropylate in a mixture of cyclohexanone and toluene to form 2-methyl-$\Delta^{1,4}$-androstadiene-11$\beta$-ol-3,17-dione, reacting the said dione in an inert organic solvent, such as dioxane, with acetylene in the presence of an alkali metal tertiary alkanolate, such as potassium t-amylate, to form the final product, 2-methyl-17$\alpha$-ethynyl-$\Delta^{1,4}$-androstadiene-11$\beta$,17$\beta$-diol-3-one.

While the above techniques are preferred, equivalent steps may be used. For example, the dehydrogenation of the 17-acetate of 2$\alpha$-methyl-$\Delta^4$-androstene-11$\beta$,17$\beta$-diol-3-one may be accomplished by fermentation with microorganisms such as *Corynebacterium simplex* and the Oppenauer reaction may be effected with any aluminum lower alkanolate. The saponification of the 17-acetate may be effected with other alkaline agents such as alkali metal or alkaline earth metal lower alcoholates. The ethynylation can be effected with different solvents and in the presence of other alkali metal tertiary alkanolates such as potassium t-butylate. The ethynylation may also be effected by producing the organomagnesium derivatives of the ketone in the 17-position.

In the following examples there are described several embodiments to illustrate the invention. However, it should be understood that the invention is not intended to be limited to the specific embodiments.

EXAMPLE

*Preparation of 2-Methyl-17$\alpha$-Ethynyl-$\Delta^{1,4}$-Androstadiene-11$\beta$,17$\beta$-Diol-3-One (IX)*

*Step A: Preparation of 2-ethoxalyl-$\Delta^4$-androstene-11$\beta$,17$\beta$-diol-3-one (II).*—Under mechanical agitation and in the absence of moisture, 25 gm. of 11$\beta$-hydroxy testosterone and 400 cc. of t-butanol were placed in a flask.

To this suspension 125 cc. of a methanol solution containing 12% of sodium methylate were added over a period of around 10 minutes under an atmosphere of nitrogen while agitating. Then, over a period of 15 minutes, a solution of 28 cc. of ethyl oxalate in 100 cc. of t-butanol was introduced. The reaction mixture was allowed to remain under agitation and under an atmosphere of nitrogen at room temperature. At the end of 18 hours the 2-ethoxalyl-$\Delta^4$-androstene-11$\beta$,17$\beta$-diol-3-one was separated in the form of its enolate with sodium, washed with methylene chloride and dried under vacuum. This enolate was dissolved in water, treated with 3 N hydrochloric acid, extracted by ethyl acetate. The extracts were combined and evaporated to dryness to give 32.3 gm. of the desired 2 - ethoxalyl - $\Delta^4$ - androstene-11$\beta$,17$\beta$-diol-3-one (II), a yield of 97.5%.

*Step B: Preparation of 2-methyl-2-ethoxalyl-$\Delta^4$-androstene-11$\beta$,17$\beta$-diol-3-one (III).*—Under mechanical agitation and in the absence of moisture, the following mixture was introduced into a flask:

32.3 gm. of compound II (2-ethoxalyl-$\Delta^4$-androstene-11$\beta$,17$\beta$-diol-3-one)
740 cc. of acetone
130 cc. of methyl iodide
50 gm. of pulverized anhydrous potassium carbonate The reaction mixture was heated at reflux with agitation for 48 hours. The mixture was then filtered to eliminate the mineral salts and the precipitate was washed with hot acetone. The filtrate was united with the acetone of the washing step and evaporated under vacuum. The evaporation residue was taken up in water and extracted by ethyl acetate. The extracts were washed with a solution of 1% sodium hydroxide, then with a dilute solution of sodium chloride and finally, with water, dried and evaporated under vacuum. 27.5 gm. or 80% of 2-methyl-2-ethoxalyl-$\Delta^4$-androstene-11$\beta$,17$\beta$-diol-3-one (III) were obtained.

*Step C: Preparation of 2$\alpha$-methyl-$\Delta^4$-androstene-11$\beta$,17$\beta$-diol-3-one (IV).*—27.5 gm. of 2-methyl-2-ethoxalyl-$\Delta^4$-androstene-11$\beta$,17$\beta$-diol-3-one (III) were dissolved in 220 cc. of absolute ethanol by warming slightly. Then the solution obtained was allowed to come to room temperature. Under an atmosphere of nitrogen, 260 cc. of a solution of 3% of sodium ethylate in ethanol were introduced and the mixture was allowed to remain at room temperature in a dark place for 48 hours. The reaction mixture was then poured into 5 liters of a mixture of ice and water. After saturating with sodium chloride, the product was extracted by ethyl acetate. The extracts were washed with a 2% sodium hydroxide solution, then with a dilute sodium chloride solution, and finally with water, dried over magnesium sulfate, filtered and evaporated. 19 gm. or 73% of 2$\alpha$-methyl-$\Delta^4$-androstene-11$\beta$,17$\beta$-diol-3-one (IV) were obtained.

*Step D: Preparation of the 17-acetate of 2$\alpha$-methyl-$\Delta^4$-androstene-11$\beta$,17$\beta$-diol-3-one (V).*—The following mixture was placed in a flask in the absence of moisture:

19 gm. of compound IV (2$\alpha$-methyl-$\Delta^4$-androstene-11$\beta$,17$\beta$-diol-3-one)
80 cc. of anhydrous pyridine
40 cc. of acetic acid anhydride.

The temperature was raised slowly during a period of one hour to 85° C., and the reaction mixture was allowed to remain overnight at room temperature. The reaction mixture was then poured into 2.4 liters of a mixture of ice and water and extracted with ethyl acetate. The extracts were combined, washed by dilute hydrochloric acid, then by a sodium hydroxide solution, then by water, dried, and evaporated under vacuum. The residue was purified by trituration with isopropyl ether, then by methylene chloride and recrystallized from absolute methanol. The purification can also be effected by chromatography on silicagel and eluting with methylene chloride containing 7% of acetone. 6.0 gm. of the 17-acetate of 2$\alpha$-methyl-$\Delta^4$-androstene-11$\beta$,17$\beta$-diol-3-one (V) were obtained, being a yield of 21% with reference to the starting compound I. Product V had a melting point of 165° C. and a specific rotation $[\alpha]_D^{20}=+156°$ (c.=1% in chloroform).

*Analysis.*—$C_{22}H_{32}O_4$; molecular weight=360.48: Calculated: C, 73.30%; H, 8.95%; O, 17.75%. Found: C, 73.2%; H, 8.9%; O, 17.5%.

*Step E: Preparation of the 17-acetate of 2-methyl-$\Delta^{1,4}$-androstadiene-11$\beta$,17$\beta$-diol-3-one (VI).*—In a flask having a reflux condenser and a nitrogen source there was placed:

1.05 gm. of the 17-acetate of 2$\alpha$-methyl-$\Delta^4$-androstene-11$\beta$,17$\beta$-diol-3-one
56 cc. of t-butanol
1.1 cc. of acetic acid
700 mg. of pulverized selenium dioxide The mixture was heated to reflux under nitrogen for a period of 90 hours, adding a supplemental 500 mg. of selenium dioxide after 48 hours of heating, then 100 mg. of selenium dioxide after 72 hours. The reaction mixture was then cooled to room temperature, 40 cc. of ethyl acetate containing animal carbon black were added and the mixture filtered. The filtrate was evaporated under vacuum and the residue was taken up in ethyl acetate. The ethyl acetate extract was washed with a solution of sodium hydroxide, then with water, dried and evaporated under vacuum. The product was purified by chromatography and recrystallized in ethanol. 560 mg. of the 17-acetate of 2-methyl-$\Delta^{1,4}$-androstadiene-11$\beta$,17$\beta$-diol-3-one (VI), a yield of 57%, were obtained. Product VI had a melting point of 184–185° C. and a specific rotation $[\alpha]_D^{20}=+44°$ (c.=1% chloroform).

*Analysis.*—$C_{22}H_{30}O_4$; molecular weight=358.46: Calculated: C, 73.71%; H, 8.44%; C, 17.85%. Found: C, 73.6%; H, 8.4%; C, 18.1%.

*Step F: Preparation of 2-methyl-Δ$^{1,4}$-androstadiene-11β,17β-diol-3-one (VII).*—550 mg. of the 17-acetate of 2-methyl-Δ$^{1,4}$-androstadiene-11β,17β-diol-3-one (VI) were dissolved by slight heating in 12 cc. of methanol. The solution was allowed to return to room temperature and 2.8 cc. of a 10% potassium hydroxide solution in methanol were added under nitrogen. The reaction mixture was allowed to stand overnight at room temperature. The mixture was then poured into 60 cc. of water and ice. The gel formed was extracted by ethyl acetate and the extracts were combined, washed and evaporated under vacuum. The 2-methyl-Δ$^{1,4}$-androstadiene-11β,17β-diol-3-one (VII) was recrystallized in aqueous isopropanol, then in benzene. The yield was 70%. The product VII had a melting point of 261° C. and a specific rotation $[\alpha]_D^{20} = +44°$ (c.=1% in dioxane).

*Analysis.*—$C_{20}H_{28}O_3$; molecular weight=316.42: Calculated: C, 75.91%; H, 8.92%. Found: C, 76.1%; H, 8.9%.

*Step G: Preparation of 2-methyl-Δ$^{1,4}$-androstadiene-11β-ol-3,17-dione (VIII).*—The following mixture was placed in a flask in the absence of moisture:

540 mg. of 2-methyl-Δ$^{1,4}$-androstadiene-11β,17β-diol-3-one (VII)
75 cc. of anhydrous toluene.

The mixture was heated to the boiling point in order to dissolve the 2-methyl-Δ$^{1,4}$-androstadiene-11β,17β-diol-3-one and 30 cc. of toluene were distilled off in order to eliminate all traces of moisture.

There was then added through a dropping funnel, and without interruption of the boiling, a solution of:

185 mg. of aluminum isopropylate
19 cc. of anhydrous toluene
3.1 cc. of cyclohexanone.

The addition was effected over a period of about 50 minutes with simultaneous distillation of 30 cc. of solvent. 15 cc. of toluene were then added over the course of about 60 minutes while distilling to replace solvent lost during distillation. The reaction mixture was cooled to room temperature. 30 cc. of water were added and the mixture decanted. The organic phase was washed with a solution of 1% sulfuric acid, then with water, finally with a normal sodium hydroxide solution and again with water. The organic phase was dried and evaporated under vacuum. 2-methyl-Δ$^{1,4}$-androstadiene-11β-ol-3,17-dione (VIII) was vacuum filtered and washed with petroleum ether, then recrystallized from benzene. The yield was of the order of 70%. Product VIII had a melting point of 228–229° C. and a specific rotation $[\alpha]_D^{20} = +110°$ (c.=1% in dioxane).

*Analysis.*—$C_{20}H_{26}O_3$; molecular weight=314.41: Calculated: C, 76.39%; H, 8.35%. Found: C, 76.3%; H, 8.5%.

*Step H: Preparation of 2-methyl-17α-ethynyl-Δ$^{1,4}$-androstadiene-11β,17β-diol-3-one (IX).*—The following mixture was placed in a flask under mechanical agitation and in the absence of moisture:

8 cc. of anhydrous t-amyl alcohol
600 mg. of potassium

The mixture was heated in an oil bath to slow reflux with agitation for an hour until solution of the potassium was complete. The flask was then cooled to room temperature, 2 cc. of anhydrous benzene added, and for 2 hours a current of purified acetylene was passed in under agitation. A solution of 375 mg. of 2-methyl-Δ$^{1,4}$-androstadiene-11β-ol-3,17-dione in 5 cc. of dry dioxane was then added and the introduction of acetylene continued, under violent agitation and at room temperature for 2 hours. The reaction mixture was then cooled with the aid of an ice bath and 2.5 cc. of 50% acetic acid was added in small portions.

The 2-methyl-17α-ethynyl-Δ$^{1,4}$-androstadiene-11β,17β-diol-3-one was extracted with chloroform. The extracts were combined, washed with water, then with a 1% sodium carbonate solution and again with water, then dried over sodium sulfate and evaporated to dryness. The product obtained was recrystallized in a mixture of methylene chloride and methyl acetate. The yield was 64%. The product had a melting point of 249–250° C. and a specific rotation $$[\alpha]_D^{20} = -20° \text{ (c.} = 1\% \text{ in dioxane)} \cdot \lambda_{\bullet = 16.000 \pm 300}^{\max.\ 249\ m\mu}$$

*Analysis.*—$C_{22}H_{28}O_3$; molecular weight=340.44: Calculated: C, 77.61%; H, 8.29%; C, 14.10%. Found: C, 77.7%; H, 8.4%; C, 14.3%.

Various modifications of the process and the products of the present invention may be made without departing from the spirit or scope thereof, and it is to be understood that the invention is limited only as defined in the appended claim.

We claim:
A compound having the formula

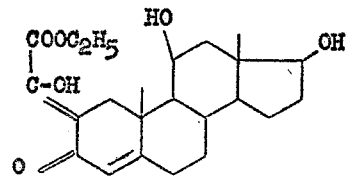

References Cited in the file of this patent
UNITED STATES PATENTS

| | | |
|---|---|---|
| 2,816,121 | Gould et al. | Dec. 10, 1957 |
| 2,883,401 | Babcock et al. | Apr. 21, 1959 |
| 2,900,398 | Wettstein et al. | Aug. 18, 1959 |
| 2,902,410 | Weintraub et al. | Sept. 1, 1959 |
| 2,906,759 | Muller et al. | Sept. 29, 1959 |

OTHER REFERENCES

Velluz et al., Journ. Am. Chem. Soc., April 1958, page 2026.

UNITED STATES PATENT OFFICE
CERTIFICATE OF CORRECTION

Patent No. 3,068,252 December 11, 1962

Gerard Nomine et al.

It is hereby certified that error appears in the above numbered patent requiring correction and that the said Letters Patent should read as corrected below.

Column 3, line 2, for "dione, reacting the said dione in an inert" read -- said free compound in an anhydrous --.

Signed and sealed this 25th day of June 1963.

(SEAL)
Attest:

ERNEST W. SWIDER
Attesting Officer

DAVID L. LADD
Commissioner of Patents